UNITED STATES PATENT OFFICE.

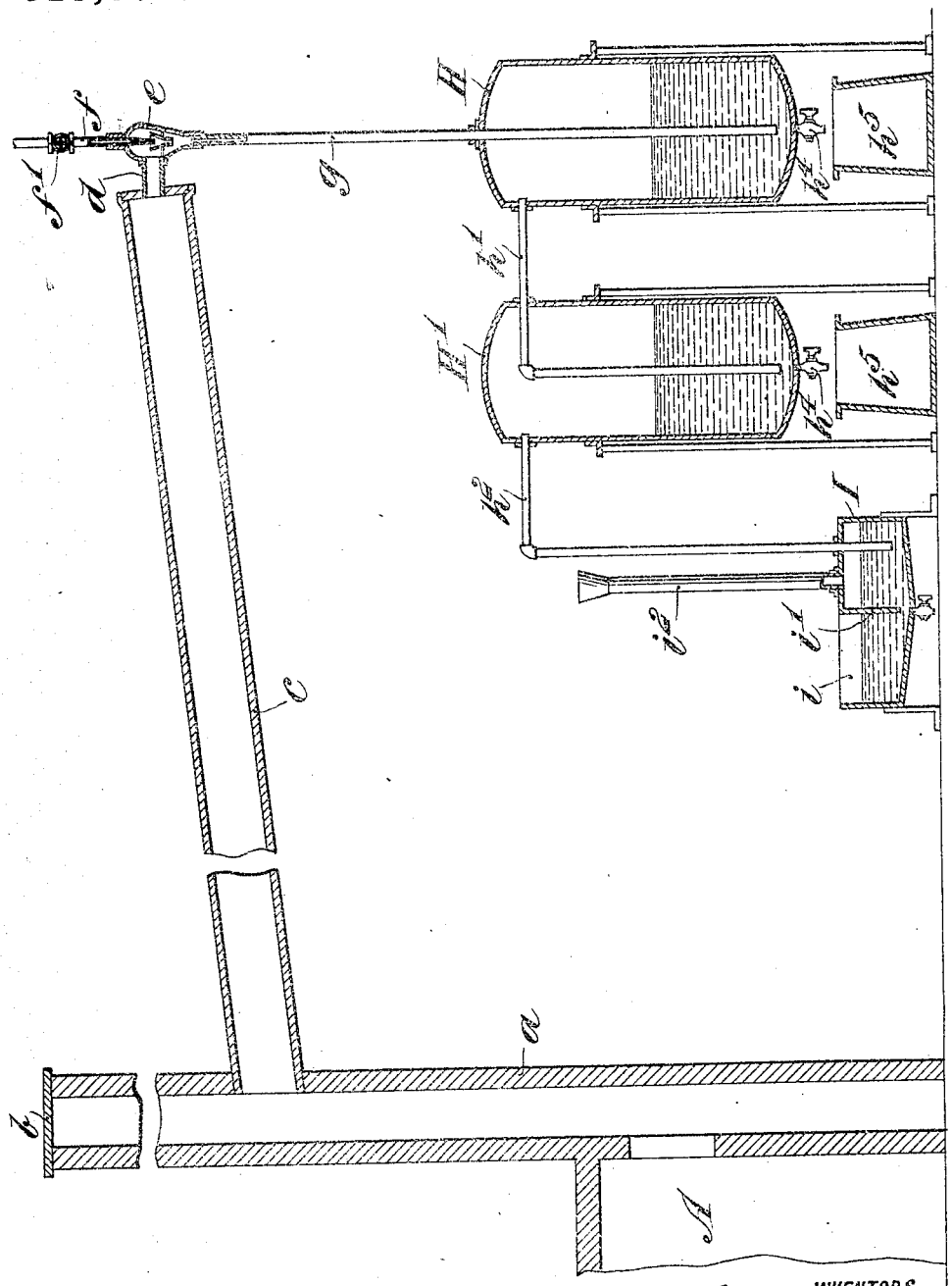

ELIAS G. PEARLMAN AND MARTIN M. PEARLMAN, OF PHILADELPHIA, PENNSYLVANIA.

METHOD OF RECOVERING ZINC COMPOUNDS AND AMMONIA.

No. 919,375.     Specification of Letters Patent.     Patented April 27, 1909.

Application filed October 3, 1908. Serial No. 455,948.

*To all whom it may concern:*

Be it known that we, ELIAS G. PEARLMAN and MARTIN M. PEARLMAN, both citizens of the United States, residing in the city of Philadelphia, in the county of Philadelphia and State of Pennsylvania, have jointly invented certain new and useful Improvements in the Method of Recovering Zinc Compounds and Ammonia, of which the following is a specification.

Our invention relates to a method of treating ammonia gas and zinc chlorid fumes resulting from roasting or smelting sal-ammoniac fluxes or skimmings, by-products of the galvanizing process, to recover zinc compounds and ammonia and to convert the same into commercial products, as zinc hydrate or oxy-hydrate, and into an ammonia by-product, as sulfate of ammonia. The said noxious ammonia gas and pungent zinc chlorid fumes arising from treatments of the described fluxes or skimmings, exist in varying proportions, and in the past have been given off to the atmosphere in the roasting or smelting of the same.

The principal object of our said invention is to utilize the said gas and fumes, under certain treatments, in different solutions, to produce commercial products as zinc hydrate or oxy-hydrate and sulfate of ammonia, or other similar products, according to the character or composition of the solutions employed, for mixing or combining such gas and fumes therewith, for deriving resultant commercial products therefrom.

Our said invention, therefore, stated in general terms, consists of recovering zinc compounds and ammonia, as commercial products, in the form of zinc hydrate or oxy-hydrate and an ammonia by-product, as sulfate of ammonia, substantially in the manner hereinafter described and claimed.

The nature and scope of our invention will be more fully understood from the following description taken in connection with the accompanying drawing, illustrating diagrammatically a plant found economical and efficient for carrying into effect therein our said method.

Referring to the drawing:—A, is an ordinary roasting or smelting furnace, in which is adapted to be introduced a batch of sal-ammoniac fluxes or skimmings, by-products of the galvanizing process, in the manufacture of spelter. The said furnace is provided with a stack $a$, which is closed at the top $b$. In the side of the stack is provided an opening, in which is introduced a terra-cotta or other suitable conduit $c$. This conduit may be exteriorly covered with asbestos or other material to protect the same against weather conditions. The forward end of the conduit $c$, is closed and provided with a pipe $d$, extending therefrom into a chambered injector device $e$, preferably of the Schutte-Korting type, for injecting in jet-like form, steam therethrough. A supply pipe $f$, is arranged so as to be connected with the device $e$, and is provided with a cut off valve $f^1$. From the device $e$, extends downward a pipe $g$, into a vertical closed vessel H, and from which vessel extends a pipe $h^1$, into a similar vessel $H^1$.

In the vessels H and $H^1$, respectively, if used in connected series, are placed solutions of quick-lime or calcium hydrate, which are agitated by the steam introduced through the pipe $h^1$, along with the ammonia gas and zinc chlorid fumes from the conudit $c$, of the roasting or smelting furnace A, conveyed thereinto and by such combined actions upon the said gas and fumes in each of the vessels H and $H^1$, is produced volatilized chlorid of zinc and volatilized ammonium chlorid or sal-ammoniac, due to the saturated solution of calcium-hydrate or quicklime therewith, in each of the said agitated solutions of the vessels H and $H^1$. Through the chlorid of zinc reacting with the calcium hydrate therein, is produced the following reaction:

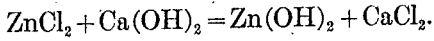

$$ZnCl_2 + Ca(OH)_2 = Zn(OH)_2 + CaCl_2.$$

The zinc hydrate formed being a solid remains in the vessel H or $H^1$, or both connected vessels, with the excess of quicklime. The calcium chlorid also formed being a solid, remains therein, but in a deliquescent state.

Through the sal-ammoniac or ammonium chlorid, reacting with the calcium-hydrate in the vessel H or $H^1$, or both connected vessels, occurs the following reaction:

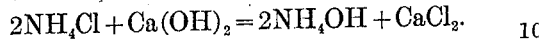

$$2NH_4Cl + Ca(OH)_2 = 2NH_4OH + CaCl_2.$$

As, in the above instance, the calcium chlorid will remain as a salt in the vessel H. The ammonia formed by the above reaction ($NH_4OH$) is a gas and will pass on into the next vessel $H^1$, wherein it fails to undergo any change, as the contents of the vessel $H^1$, is the same as that of the vessel H, namely calcium-hydrate. The action in the second vessel H¹, serves merely as a safeguard against any incomplete reactions in the first vessel H, and thus preventing waste of a valuable product to be utilized under conditions as above defined. The ammonia gas as above then passes on through a pipe H², into a tank I, partly open at $i$, and having a depending roof or dome $i^1$, extending down into a suitable solution of this tank, preferably, consisting of dilute sulfuric acid, for converting readily the ammonia gas of the solution into sufate of ammonia, as a commercial product. Such reaction taking place is as follows:—

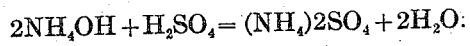

The ammonium sulfate thus formed is a solid and the other product is water. Both of the foregoing commercial products thus obtained being derived in the described manner from the making of the main product spelter by the roasting or smelting of sal-ammoniac fluxes or skimmings and as will be readily understood, other chemical by-products from the recovery of ammonia gas and zinc chlorid fumes may be obtained, if mixed with other solutions than those hereinbefore described.

The tank I, is provided with an escape pipe $i^2$, through which any non-pungent vapors may escape into the atmosphere, after completion of the foregoing operations.

By the series of treatments hereinabove described, it will be found as extended practice has demonstrated, that the ammonia gas and chlorid fumes arising from the treatment of the principal material are not only fully recovered and utilized, but any vapors liberated into the atmosphere, will be odorless and unobjectionable.

In the bottom of each of the vessels H and H¹, are provided plug valves $h^4$, for by the operation thereof, permitting the freeing of the zinc hydrate or oxy-hydrate recovered into receptacles $h^5$, for use.

We claim:—

1. The method of recovering zinc compounds and ammonia, which consists in roasting or smelting sal-ammoniac-fluxes or skimmings, by-products of the galvanizing process, acting on the gases and fumes given off first with steam, then with an alkaline solution and finally treating the remaining gases with an acid solution, substantially as and for the purposes described.

2. The method of recovering zinc compounds and ammonia, which consists in roasting or smelting sal-ammoniac fluxes or skimmings, by-products of the galvanizing process, passing the gases and fumes given off with steam through an alkaline solution to derive as a resultant product, zinc hydrate or oxy-hydrate and then further acting on the remaining gases with an acid solution, to derive as a resultant product, an ammonium salt, substantially as described.

3. The method of recovering zinc compounds and ammonia, which consists in roasting or smelting sal-ammoniac fluxes or skimmings, by-products of the galvanizing process, passing the gases and fumes given off through agitated milk of lime to derive as a resultant product, zinc hydrate or oxy-hydrate and then passing the remaining gases through a solution of sulfuric acid to derive as a resultant product, sulfate of ammonia, substantially as described.

In witness whereof, we have hereunto set our signatures in the presence of two subscribing witnesses.

ELIAS G. PEARLMAN.
MARTIN M. PEARLMAN.

Witnesses:
J. WALTER DOUGLASS,
THOMAS M. SMITH.